J. WIELOBÓB.
NON-SKIDDING DEVICE.
APPLICATION FILED MAR. 4, 1914.
1,115,636.
Patented Nov. 3, 1914.
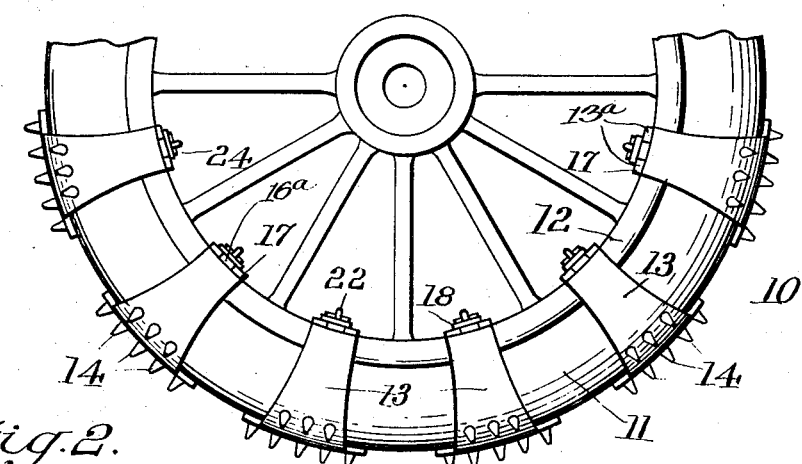
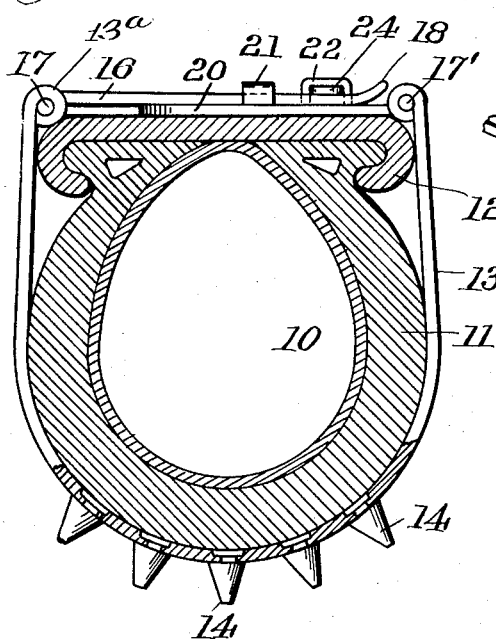
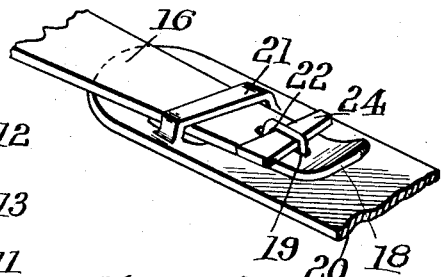
Witnesses
Inventor
John Wielobób
By A. M. Wilson
Attorney

UNITED STATES PATENT OFFICE.

JOHN WIELOBÓB, OF CARNEGIE, PENNSYLVANIA, ASSIGNOR OF ONE-HALF TO MICHAEL ZYWAR, OF CARNEGIE, PENNSYLVANIA.

NON-SKIDDING DEVICE.

1,115,636.  Specification of Letters Patent.  Patented Nov. 3, 1914.

Application filed March 4, 1914. Serial No. 822,377.

*To all whom it may concern:*

Be it known that I, JOHN WIELOBÓB, a subject of the Emperor of Austria-Hungary, residing at Carnegie, in the county of Allegheny and State of Pennsylvania, have invented certain new and useful Improvements in Non-Skidding Devices, of which the following is a specification.

This invention relates to improvements in non-skidding devices and is more especially adapted for use upon automobile wheels.

The primary object of this invention is to provide a tread gripping device applicable in plurality in any desired number upon a vehicle wheel and one that may be easily applied and removed.

A further object of the device is to provide a safety tread grip with means for positively preventing any side slipping or skidding of a wheel to which the device is applied and to also afford a positive traction contact of the wheel with the road bed.

A still further object is the provision of a non-skid unit or link which is easy and cheap to manufacture but at the same time efficient in the performance of its functions and is instantly attachable to a wheel by a spring hasp locking device.

With these general objects in view and others that will appear as the nature of the invention is better understood, the same consists in the novel construction, combination and arrangement of parts to be hereinafter more fully described and then claimed, reference being had to the accompanying drawings by like characters throughout the several views and wherein:—

Figure 1 is a side elevation of a portion of an automobile wheel illustrating six of the link devices applied thereto. Fig. 2 is a vertical transverse sectional view taken through the wheel and through a portion of the tread of one of the links. Fig. 3 is a perspective view of the spring hasp and lock, and Fig. 4 is a side view of a modified form of calk detached.

Referring more in detail to the drawings, the automobile wheel 10 is illustrated consisting of the usual pneumatic tire 11 mounted upon the clencher rim 12 and shown in Fig. 1 with the present invention mounted thereon in active position.

The link constituting the present invention consists of a body strip 13 preferably of sheet spring metal and provided midway of its ends with sharpened calks 14 riveted thereto or as illustrated by the calk 15 in Fig. 4 screw-threaded into the tread portion thereof. The inner ends of each of the links 13 are slitted and bent to provide pintle-receiving seats 13$^a$.

The spring hasp member 16 is pivoted by a hinge joint 17 to one end of the body strip 13 and is provided with an upturned free end 18 and an intermediate slot 19. The other end of the body strip has pivoted thereto by a similar hinge joint 17' the coöperating hasp member 20 provided with a struck up loop 21 and a longitudinally mounted eye 22. The outer end of each of the hasp members 16 and 20 is provided with a pintle seat 16$^a$ registering with the seats 13$^a$ of the links 13 to receive a hinge pintle, whereby when the two hasps are overlapped the inner ends of the links are firmly clamped against the upper portion of the sides of the rim.

With the link formed as above described, the body portion thereof is adapted to be placed over the automobile wheel with the calked portion upon the tread surface of the pneumatic tire. The hasp members are hinged to overlap and lie substantially flat upon the inner surface of the rim. In the assembling operation, the upturned end 18 of the spring hasp 16 is projected through the loop 21 and forced over the eye 22 until the slot 19 snaps or slips over the eye 22 and whereupon a cotter or wedge 24 is readily placed through the eye thus locking and retaining the hasp members in their closed relations and the calk carrying body strip firmly upon the tire.

While the forms of the invention herein shown and described are what are believed to be preferable embodiments thereof, it is nevertheless to be understood that minor changes may be made in the form, proportion and details of construction without departing from the spirit and scope of the invention as set forth in the appended claim.

I claim:—

The combination with a vehicle wheel rim and tire, of a non-skid device comprising sheet metal links, each consisting of a U-shaped body portion extending around the tire, and provided with projections in its tread portion and having its ends slitted and inturned to provide pintle receiving seats which project inward over the side edges of the wheel rim, in combination with resilient hasps each provided at its outer end with a pintle seat registering with the inturned portions of the link ends, pintels fitting within said registering seats, said hasps being overlapped in closely-abutting relation flatly upon the inner surface of the rim to clamp the inturned inner ends of the link against the upper outer edges of the rim, and means for detachably connecting the overlapped hasps together.

In testimony whereof I affix my signature in presence of two witnesses.

JOHN WIELOBÓB.

Witnesses:
 JOHN KIJOUSKI,
 MORERLL FOLSEK.